Nov. 24, 1970  G. P. HICKS ET AL  3,542,662
ENZYME ELECTRODE
Filed April 18, 1967  3 Sheets-Sheet 1
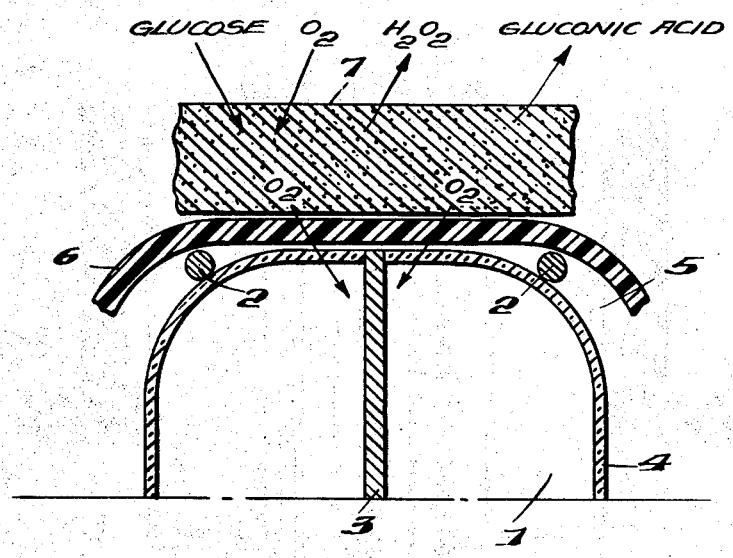
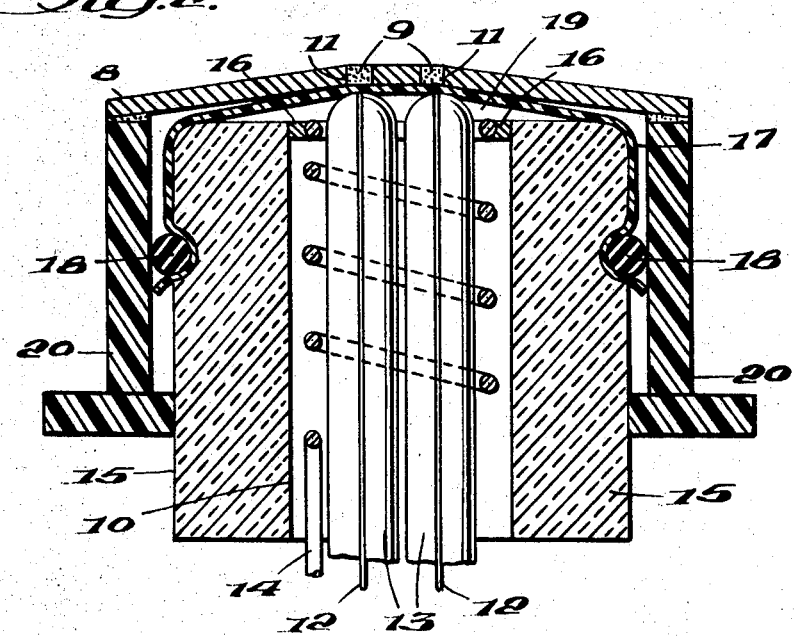
INVENTORS
GEORGE P. HICKS,
STUART J. UPDIKE,
BY Robert A Lesan
AGENT

Nov. 24, 1970 G. P. HICKS ET AL 3,542,662
ENZYME ELECTRODE
Filed April 18, 1967
3 Sheets-Sheet 2
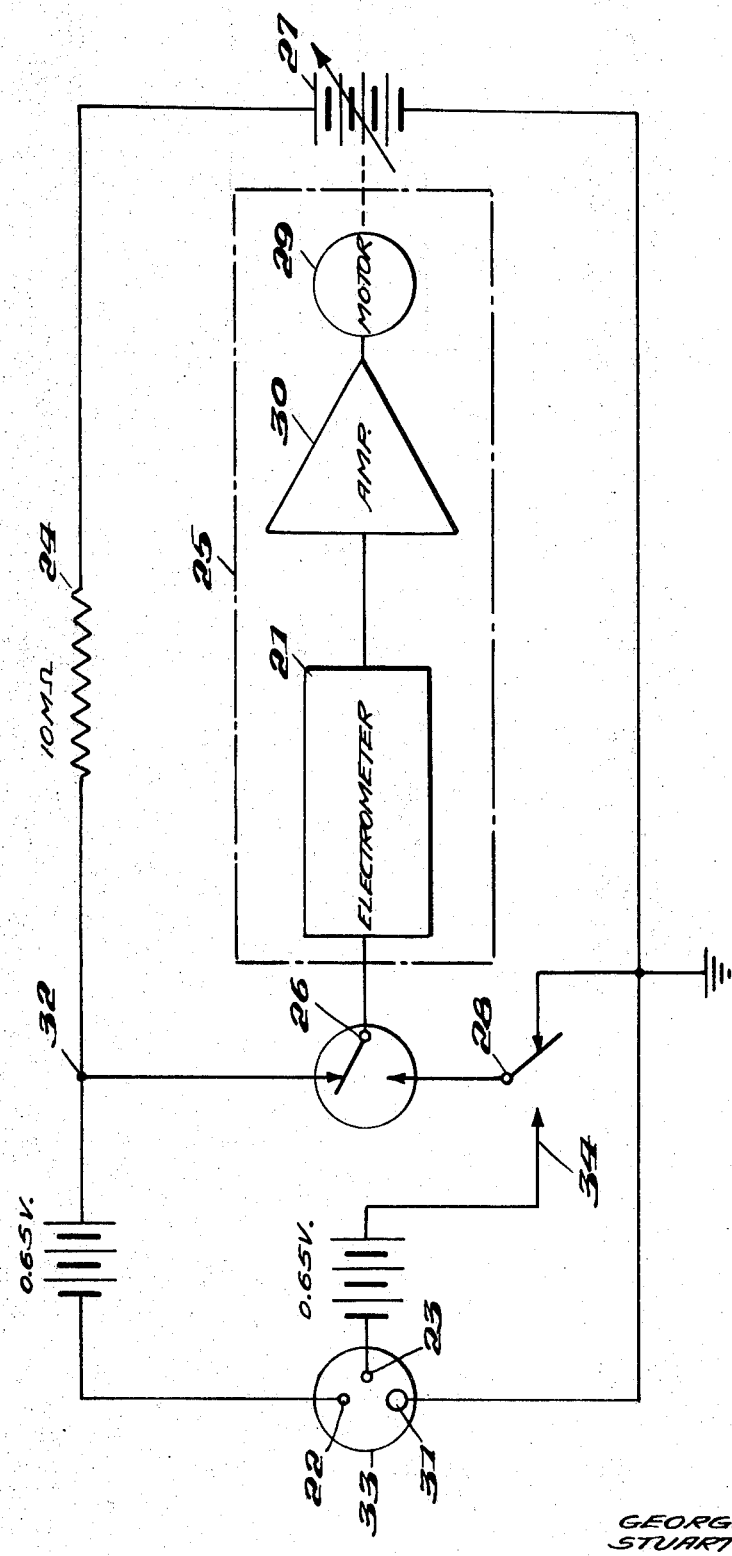

United States Patent Office 3,542,662
Patented Nov. 24, 1970

3,542,662
ENZYME ELECTRODE
George P. Hicks and Stuart J. Updike, Madison, Wis., assignors to E. I. du Pont de Nemours and Company, Wilmington, Del., a corporation of Delaware
Filed Apr. 18, 1967, Ser. No. 631,717
Int. Cl. G01n 27/46
U.S. Cl. 204—195   13 Claims

ABSTRACT OF THE DISCLOSURE

An electrochemical transducer, suitable for in vivo biomedical applications, constructed by polymerizing a gelatinous membrane of an enzyme gel, e.g., a polycarylamide matrix having glucose oxidase molecules interspersed therein, over the measuring surface of an oxygen-sensing device, such as a polarographic oxygen electrode. The oxygen sensing device may contain a single cathode or a pair of cathodes capable of performing differential measurements by deactivating the enzyme adjacent one of the cathodes.

CROSS REFERENCES TO RELATED APPLICATIONS

This invention is particularly related to the subject matter of application Ser. No. 631,716, filed on the same day, entitled Enzyme Gel and Use Therefor by inventors G. P. Hicks and S. J. Updike in that the instant invention may be used in the analytical systems disclosed and claimed therein to determine a characteristic of an enzymatic reaction. This cross reference is merely illustrative and is intended in no way to restrict the scope or use of the present invention.

SUMMARY OF THE INVENTION

Advances in biomedical telemetry have made possible the continuous remote monitoring of such physiological variables as temperature, gastrointestinal and blood pressures, respiratory rate and biopotentials (ECG and EEG). Instrumentation is also available to continuously measure in vivo $pO_2$, $pCO_2$, blood pH and electrolytes, and gastric pH. The present invention, an enzyme electrode, allows the further extension of biomedical instrumentation to continuous in vivo measurement of chemical substances of intermediary metabolism such as glucose.

The subject enzyme electrode is an electrochemical transducer comprising (A) an oxygen-sensing device having anode system comprising at least one anode, a single or dual cathode system referenced to said anode system, a membrane of oxygen specifically adjacent said cathode system and an electrolyte solution positioned to provide a conductive path between said anode and said cathode systems and (B) an enzyme in proximity to said membrane of said oxygen-sensing device.

For a more detailed understanding of the invention reference is made to the subsequent description of various embodiments thereof and to the attendant drawings wherein:

FIG. 1 illustrates an enzyme electrode incorporating an embodiment of the invention;

FIG. 2 shows a dual cathode enzyme electrode entailing another embodiment;

Figure 4:
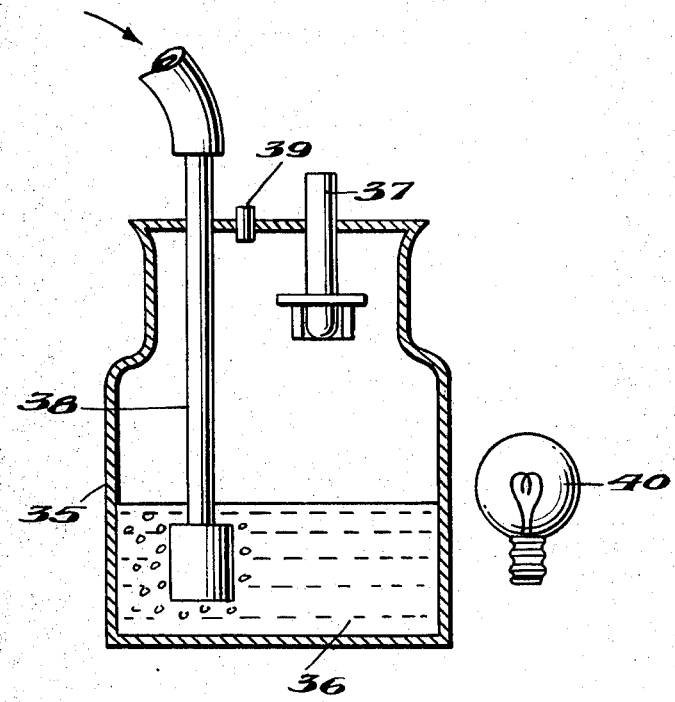
Figure 5:
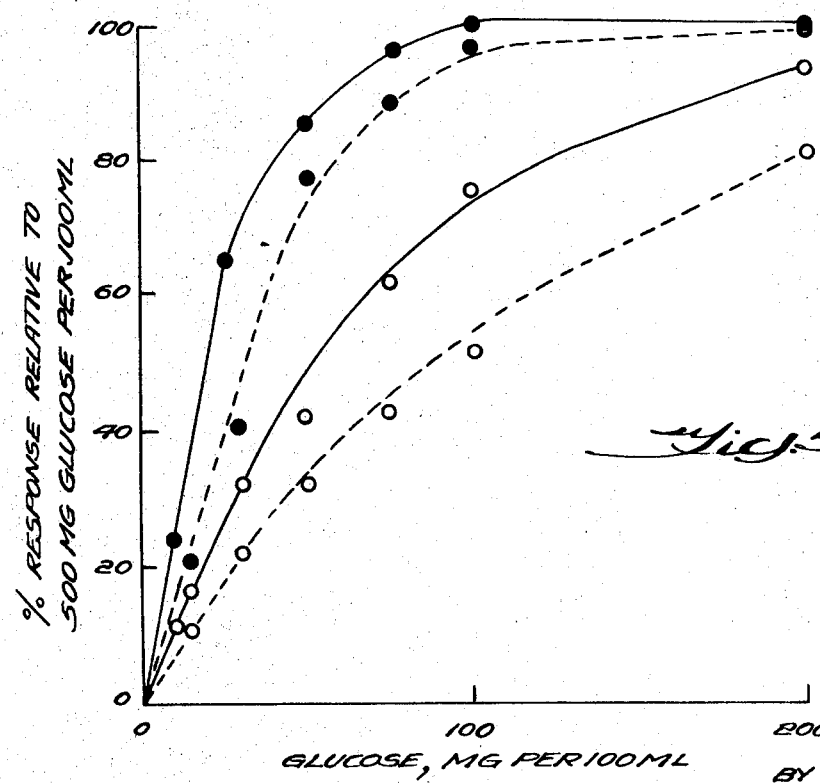

FIG. 3 schematically indicates an electrical circuit which may be used to measure the current response of an enzyme electrode;

FIG. 4 depicts one form of apparatus for the polymerization of an enzyme gel on an oxygen-sensing device; and FIG. 5 graphically portrays the response of one form of enzyme electrode to different enzyme gels.

To more clearly illustrate the nature of the invention references will be made to oxygen-sensing devices constructed from specific materials and to a particular enzyme gel comprised of a certain polyacrylamide having dispersed therein molecules of the enyme glucose oxidase. It is to be pointed out that any sensing device dependent upon the diffusion flow of oxygen through a membrane may be substituted; that the use of a polyacrylamide, in fact the use of any polymer, is only one of many means to substantially fix the enzyme in relation to the aforementioned membrane; and that specifically for other substrates, such as those of the dehydrogenase enzymes, may be obtained by, for example, incorporating a dehydrogenase enzyme and adding cofactors, e.g., NAD (nicotinamide adenine dinucleotide), and electron carriers, e.g., PMS (phenazine methosulfate).

As shown in FIG. 1, an oxygen-sensing device 1, having an anode 2, a cathode 3 enclosed by glass 4 and an electrolyte solution 5, measures the diffusion flow of oxygen through a plastic membrane 6. The current output of this device is a linear function of oxygen tension which in turn varies directly with the diffusion flow of oxygen. Specificity for glucose may be obtained by coating on the membrane 6 an enzyme gel 7 of glucose oxidase interspersed within a polyacrylamide. When this enzyme electrode is placed in contact with a biological solution or tissue, glucose and oxygen diffuse into the enzyme gel layer 7 with a corresponding outward flow of $H_2O_2$ and gluconic acid. The diffusion flow of oxygen through plastic membrane 6 is reduced in the presence of glucose oxidase GO and glucose by the enzyme catalyzed reaction of glucose and oxygen in accordance with the following reaction:

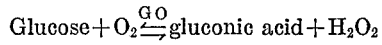

$$\text{Glucose} + O_2 \xrightarrow{GO} \text{gluconic acid} + H_2O_2$$

When oxygen is in nonrate limiting excess and the glucose concentration is sufficiently low (as later discussed), there is a linear relationship between glucose concentration and decrease in oxygen tension. The output current of the enzyme electrode is measured after sufficient time is allowed for the diffusion process to achieve steady state. This interval varies from about 30 seconds to 3 minutes for 98% of steady response, depending primarily on the thickness of the plastic membrane 6 and the enzyme gel layer 7. Single cathode oxygen-sensing devices are commercially available or can be made in the laboratory. It is desirable to limit the cathode tip, generally of platinum or gold, to a small diameter (~25 microns or less) if measurements in stagnant solutions are to be made without altering the overall concentration of the solution.

All of the following discussion and the corresponding data obtained are based on a representative dual cathode enzyme electrode as depicted in FIG. 2. A nylon net 8 ~35 microns thick impregnated with silicone plastic cement is used as a support to anchor the enzyme gel layer 9 over the rigid oxygen-sensing device 10. Small holes 11, 50 to 300 microns in diameter, are made in the impregnated net 8 directly over the tips of the cathodes 12 by thermal puncture with a fine point hot platinum wire. The oxygen-sensing device 10 may be constructed by (A) providing a pair of platinum cathodes 12 enclosed in glass capillary tubes 13, (B) spiraling a single silver-silver chloride anode 14 around said cathodes, (C) placing a glass housing 15 around said cathodes and anode, (D) sectioning off the upper portions of said cathodes and anode by using an epoxy seal 16 between said cathodes and anode and said housing (E) enclosing said upper portions by covering with a plastic membrane 17 secured by 2 rubber O rings 18 and (F) adding an electrolyte solution 19. The impregnated net 8 is anchored by plastic cap 20 placed around oxygen sensing device 10. This enzyme electrode may be used with a single cathode just as a single cathode enzyme electrode or with both cathodes as a differential enzyme electrode as is discussed in more detail hereinafter.

An electronic circuit such as shown, for example, in FIG. 3 may be used to transform the electrical signal from the enzyme electrode into meaningful data. In this block diagram an electrometer recorder 21 is used for both single 22 and dual 22 and 23 cathode measurements. A feedback resistor 24 is placed between the recorder servopotentiometer 25 and the chopper contact 26. The potential developed across the resistor 24 is a balancing reference voltage 27. When the chopper contact 26 is grounded, as shown at 28, the servomotor 29 with amplifier 30 will balance when the current through the resistor 24 is equal to the current flowing from anode 31 to the cathode 22, thereby making the voltage at point 32 equal to ground potential. Therefore, the current in the enzyme electrode 33 equals the voltage 27 divided by the value of the resistor 24 according to Ohm's law. When the contact 28 is in the dual position 34, the servomotor 29 will balance when the current through the resistor 24 is equal to the difference between the currents of the two cathodes 22 and 23.

In one method for polymerization of the enzyme gel layer, two reagents are prepared in 0.1 molar phosphate buffer, pH 7.4 (A) a 50% solution of acrylamide and (B) a 3% solution of N,N methylenebisacrylamide. To entrap the enzyme in the polymer matrix, 2 mg. of glucose oxidase GO are dissolved in 2 drops of physiological saline solution. Four drops of the acrylamide reagent are mixed with 12 drops of the bisacrylamide solution and about 0.01 mg. of riboflavin and 0.01 mg. of ammonium persulfate are added to catalyze the copolymerization reaction. While viewing through a dissecting microscope, the tiny puncture sites in the supporting net are immediately filled with the enzyme gel solution using a micropipette. The copolymerization reaction is inhibited by oxygen and requires light. Therefore, a deoxygenated polymerization chamber 35 containing a solution of sodium dithionate 36 is constructed as diagrammed in FIG. 4. The enzyme electrode assembly 37 is placed in the chamber 35 and nitrogen gas, introduced through element 38 and vented through vent 39, is used to flush oxygen out of the chamber 35. The photocatalytic polymerization reaction using preferably a No. 2 photo lamp 40 is complete in less than 10 minutes. Detailed information for the preparation of different acrylamide gels with enzyme gel activity is provided in aforementioned Ser. No. 631,716.

The technique for measuring glucose concentration with the glucose oxidase enzyme electrode is similar in manner to the measurements of hydrogen ion concentration. After a standard curve is constructed with standard glucose solutions, the electrode is ready for use.

The calibration curve of this analytical device is first order at low substrate concentrations, becoming zero order at high substrate concentrations. Calibration curves were studied as a function of intragel enzyme concentration and pore size. Four calibration curves prepared with different gels are graphed in FIG. 5. (The solid line curves are based upon using 1000 mg. GO per 100 ml. of gel; the dotted line curves are based on using 100 mg. GO per 100 ml. of gel; the curves having solid circles are based upon using gels of 8 percent by weight of monomer+crosslinking agent; and the curves having open circles are based upon using gels of 19 percent by weight of monomer+crosslinking agent.)

An increase in the monomer and crosslinking agent concentration decreases intragel pore size and displaces the calibration curve to the right, extending the linear calibration range, but decreasing sensitivity. An increase in the integral enzyme concentration displaces the calibration curve to the left, decreasing the range of linearity, but increasing sensitivity.

The glucose oxidase enzyme electrode is temperature sensitive with an increase in electrode output of about 5.3% per degree centigrade in the range 25–40 degrees centigrade and can be made to function with ample sensitivity at zero degrees centigrade. Recalibration of an enzyme electrode that was left overnight in buffer solution at room temperature was within ±10% of the previous day's calibration. Enzyme membranes can be dried in room air and rehydrated with the recovery of activity.

Oxygen sensing devices can be made essentially independent of solution flow by using a platinum cathode of tip diameter less than 25 microns and plastic membranes of 25 microns or greater thickness. Using these specifications, only a negligible amount of oxygen is consumed at the surface of the microcathode, and the diffusion flow of oxygen through the plastic membrane becomes a rate limiting process which varies with oxygen tension. Similarly, to minimize the effect of flow on the enzyme electrode response, the orifice over the cathode is made as small in diameter as technically possible.

The single cathode glucose oxidase enzyme electrode is sensitive to changes in the concentration of both glucose and oxygen. For in vivo monitoring of tissue glucose concentration, a glucose transducer independent of oxygen tension is desired. To essentially eliminate the sensitivities to changes in oxygen tension not mediated through glucose oxidase, the dual cathode enzyme electrode shown in FIG. 2 can be used. Glucose oxidase gel is fixed in each of the two micro puncture sites. Since glucose oxidase activity is rapidly destroyed above 70 degrees centigrade, one of the two enzyme cathodes can be made unresponsive to glucose by heat inactivation of its enzyme activity. However, this heat inactivated cathode remains responsive to changes in oxygen tension. By recording the difference between the output of the two cathodes referenced against the same silver-silver chloride electrode, an enzyme electrode sensitive to changes in glucose concentration, but relatively insensitive to changes in oxygen tension is obtained.

It will be understood that various changes in the details, materials, steps, and arrangement of parts which have been herein described and illustrated in order to explain the nature of the invention, may be made by those skilled in the art within the principle and scope of the invention as expressed in the appended claims.

We claim:

1. An electrochemical transducer comprising (1) an oxygen-sensing device having an anode, a cathode referenced to said anode, a membrane of oxygen specificity in contact with said cathode and an electrolyte solution positioned to provide a conductive path between said anode and said cathode and (2) an enzyme gel in contact with said membrane of said oxygen-sensing device and separated by said membrane from said cathode of said oxygen-sensing device, said enzyme gel being rigid and comprising a matrix of a polymer and molecules of an active enzyme interspersed therein, said molecules of said active enzyme being distributed homogeneously throughout and substantially unreacted with said matrix of said polymer, said matrix of said polymer having a sufficiently small pore size to retain said molecules of said enzyme.

2. The electrochemical transducer of claim 1 wherein said polymer is an acrylic polymer.

3. The electrochemical transducer of claim 1 wherein said polymer is an acrylamide polymer.

4. The electrochemical transducer of claim 1 wherein said polymer is a polymer of acrylamide and N,N-methylenebisacrylamide.

5. The electrochemical transducer of claim 4 wherein said enzyme is glucose oxidase.

6. The electrochemical transducer of claim 1 wherein said enzyme is oxidase.

7. An electrochemical transducer comprising (1) an oxygen-sensing device having an anode, a pair of cathodes referenced to said anode, a membrane of oxygen specificity adjacent said pair of cathodes and an electrolyte solution positioned to provide a conductive path between said anode and said pair of cathodes and (2) an enzyme gel, in proximity to said membrane of said oxygen-sensing device and separated by said membrane from said pair of cathodes of said oxygen-sensing device, said enzyme gel comprising a matrix of a polymer and molecules of an enzyme constrained by said matrix of said polymer, said molecules of said enzyme in proximity to one of said pair of cathodes being inactive.

8. The electrochemical transducer of claim 7 wherein said molecules of said active enzyme are distributed homogeneously throughout and substantially unreacted with said matrix of said polymer, said matrix of said polymer having a sufficiently small pore size to retain said molecules of said enzyme.

9. The electrochemical transducer of claim 7 wherein said polymer is an acrylic polymer.

10. An electrochemical transducer of claim 7 wherein said polymer is an acrylamide polymer.

11. The electrochemical transducer of claim 7 wherein said polymer is a polymer of acrylamide and N,N-methylenebisacrylamide.

12. The electrochemical transducer of claim 11 wherein said enzyme is glucose oxidase.

13. The electrochemical transducer of claim 7 wherein said enzyme is an oxidase.

References Cited

UNITED STATES PATENTS

| 3,296,113 | 1/1967 | Hansen | 204—195 |
| 3,328,277 | 6/1967 | Solomons et al. | 204—195 |

FOREIGN PATENTS

| 659,059 | 3/1963 | Canada | 195—63 |

OTHER REFERENCES

Clark et al. "Reprint from Annals of the New York Academy of Science," vol. 102, art. 1, pp. 39–45, October 1962.

Bernfeld et al., "Science," vol. 142, 1964, pp. 678–679.

Bauman et al., "Analytical Chem.," vol. 37, No. 11, 1965, pp. 1378–81.

TA-HSUNG TUNG, Primary Examiner

U.S. Cl. X.R.

195—103.5, 204—1